United States Patent
Tao et al.

(10) Patent No.: US 9,057,434 B2
(45) Date of Patent: Jun. 16, 2015

(54) METHOD OF IDENTIFYING A SYNCHRONOUS POSITION OF A SYNCHRONIZER ACTUATOR FORK OF A DUAL CLUTCH TRANSMISSION

(71) Applicant: GM GLOBAL TECHNOLOGY OPERATIONS LLC, Detroit, MI (US)

(72) Inventors: Xuefeng Tim Tao, Northville, MI (US); Matthew Kempeinen, Pinckney, MI (US); Jeryl McIver, Inkster, MI (US); Christopher Jay Weingartz, Holly, MI (US); David H. Vu, East Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 13/906,735

(22) Filed: May 31, 2013

(65) Prior Publication Data

US 2014/0358383 A1    Dec. 4, 2014

(51) Int. Cl.
*G06F 7/00* (2006.01)
*F16H 61/04* (2006.01)
*F16H 61/688* (2006.01)
*F16H 61/28* (2006.01)

(52) U.S. Cl.
CPC .... *F16H 61/0403* (2013.01); *F16H 2061/2823* (2013.01); *F16H 2061/2869* (2013.01); *F16H 61/688* (2013.01); *F16H 2061/283* (2013.01); *F16H 2342/042* (2013.01); *Y10T 477/753* (2015.01); *Y10T 74/19284* (2015.01); *F16H 2306/48* (2013.01)

(58) Field of Classification Search
CPC ............... F16H 61/28; F16H 61/688; F16H 2061/2869; F16H 2061/2823; F16H 2061/283; F16H 2342/02; F16H 2342/04; F16H 2342/042; F16H 61/0403; F16H 2306/48; B60W 10/02; B60W 10/113; Y10T 477/70; Y10T 477/753; Y10T 74/19228; Y10T 74/19233; Y10T 74/19284; Y10T 74/19288
See application file for complete search history.

(56) References Cited

U.S. PATENT DOCUMENTS

| | | | | |
|---|---|---|---|---|
| 4,614,126 | A * | 9/1986 | Edelen et al. | 74/333 |
| 6,883,394 | B2 * | 4/2005 | Koenig et al. | 74/335 |
| 7,073,407 | B2 * | 7/2006 | Stefina | 74/331 |
| 8,831,845 | B1 * | 9/2014 | Tao et al. | 701/60 |
| 8,844,393 | B2 * | 9/2014 | Weingartz et al. | 74/335 |
| 2014/0007727 | A1 * | 1/2014 | Weingartz et al. | 74/473.11 |

* cited by examiner

*Primary Examiner* — David D Le
(74) *Attorney, Agent, or Firm* — Quinn Law Group, PLLC

(57) ABSTRACT

A method of identifying a synchronous position of a synchronizer actuator fork includes sensing a deceleration rate of a first shaft, when a synchronizer is positioned in a neutral position, to define a first rate of deceleration. The synchronizer is moved along the first shaft from the neutral position toward a gear with a synchronizer actuator fork. A deceleration rate of the first shaft is sensed, while the synchronizer actuator fork moves the synchronizer along the first shaft, to identify a change from the first rate of deceleration to a second rate of deceleration. The location, of the synchronizer actuator fork relative to the first shaft, at which the rate of acceleration of the first shaft changes from the first rate of deceleration to the second rate of deceleration, is identified as the synchronous position of the synchronizer actuator fork.

19 Claims, 3 Drawing Sheets

METHOD OF IDENTIFYING A SYNCHRONOUS POSITION OF A SYNCHRONIZER ACTUATOR FORK OF A DUAL CLUTCH TRANSMISSION

TECHNICAL FIELD

The invention generally relates to a method of controlling a dual clutch transmission, and more specifically to a method of learning a synchronous position of a synchronizer actuator fork of the dual clutch transmission.

BACKGROUND

Dual clutch transmissions include a plurality of synchronizers. Each synchronizer moves along a layshaft into and out of interlocking engagement with at least one, and often two different gears to rotatably couple one of the gears to the layshaft. Each synchronizer includes a synchronizer actuator fork that moves the synchronizer axially along the layshaft. A transmission control module must know a position of the synchronizer actuator fork when the synchronizer is engaged with each of the different gears, a neutral position of the synchronizer actuator fork when the synchronizer is not engaged with any of the different gears, and a synchronous position in which the synchronizer initially contacts each of the different gears but is not yet fully engaged with the different gears, in order to properly control the operation of the dual clutch transmission.

SUMMARY

A method of operating a dual clutch transmission is provided. The method includes sensing a deceleration rate of a first shaft when a synchronizer is positioned in a neutral position to define a first rate of deceleration. The synchronizer is moved along the first shaft from the neutral position toward a gear with a synchronizer actuator fork. A deceleration rate of the first shaft is sensed while the synchronizer actuator fork moves the synchronizer along the first shaft to identify a change from the first rate of deceleration to a second rate of deceleration. The location of the synchronizer actuator fork relative to the first shaft at which the rate of deceleration of the first shaft changes from the first rate of deceleration to the second rate of deceleration is identified as a synchronous position of the synchronizer actuator fork.

A method of identifying a synchronous position of a synchronizer actuator fork of a dual clutch transmission is also provided. The method includes sensing a status of a first clutch and a second clutch to determine if the first clutch and the second clutch are disposed in an engaged state or a disengaged state. A rotational speed of a second shaft is sensed. A deceleration rate of a first shaft is sensed, when a synchronizer is positioned in a neutral position, to define a first rate of deceleration. When the sensed rotational speed of the second shaft is equal to or less than a pre-determined near zero speed, and when the first clutch and the second clutch are each disposed in their respective disengaged states, then the synchronizer is moved along the first shaft from the neutral position toward a gear with a synchronizer actuator fork. A deceleration rate of the first shaft is sensed while the synchronizer actuator fork moves the synchronizer along the first shaft. A change in the deceleration rate, from the first rate of deceleration to a second rate of deceleration, is identified while the synchronizer actuator fork moves the synchronizer along the first shaft. A location of the synchronizer actuator fork relative to the first shaft, at which the rate of deceleration of the first shaft changes from the first rate of deceleration to the second rate of deceleration, is identified as the synchronous position of the synchronizer actuator fork.

A dual clutch transmission for a vehicle is also provided. The dual clutch transmission includes a first shaft supporting at least one synchronizer and at least one gear thereon. A synchronizer actuator fork is coupled to the synchronizer. The synchronizer actuator fork is operable to move the synchronizer along the first shaft between a neutral position and an engaged position. A control module is configured to control the operation of the synchronizer actuator fork. The control module is operable to sense a deceleration rate of the first shaft, when the synchronizer is positioned in the neutral position, to define a first rate of deceleration. The synchronizer is moved along the first shaft from the neutral position toward the gear and into the engaged position with the synchronizer actuator fork. A deceleration rate of the first shaft is sensed while the synchronizer actuator fork moves the synchronizer along the first shaft toward the gear, to identify a change in the acceleration rate of the first shaft from the first rate of deceleration to a second rate of deceleration. The control module is also operable to identify the location of the synchronizer actuator fork relative to the first shaft, at which the rate of deceleration of the first shaft changes from the first rate of deceleration to the second rate of deceleration, and define the identified location as the synchronous position of the synchronizer actuator fork.

Accordingly, the control module of the dual clutch transmission is operable to identify the location of the synchronizer actuator fork relative to the first shaft at which the rate of acceleration of the first shaft changes from the first rate of acceleration to the second rate of acceleration, while the synchronizer actuator fork is moving the synchronizer from the neutral position toward the gear and into the engaged position. The identified location of the synchronizer actuator fork relative to the first shaft where the rate of acceleration changes from the first rate of deceleration to the second rate of deceleration is identified and/or defined as the synchronous position of the synchronizer actuator fork. The control module may then use the identified synchronous position of the synchronizer actuator fork in the control and operation of the dual clutch transmission to accurately and precisely control the engagement and disengagement of the respective gear.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
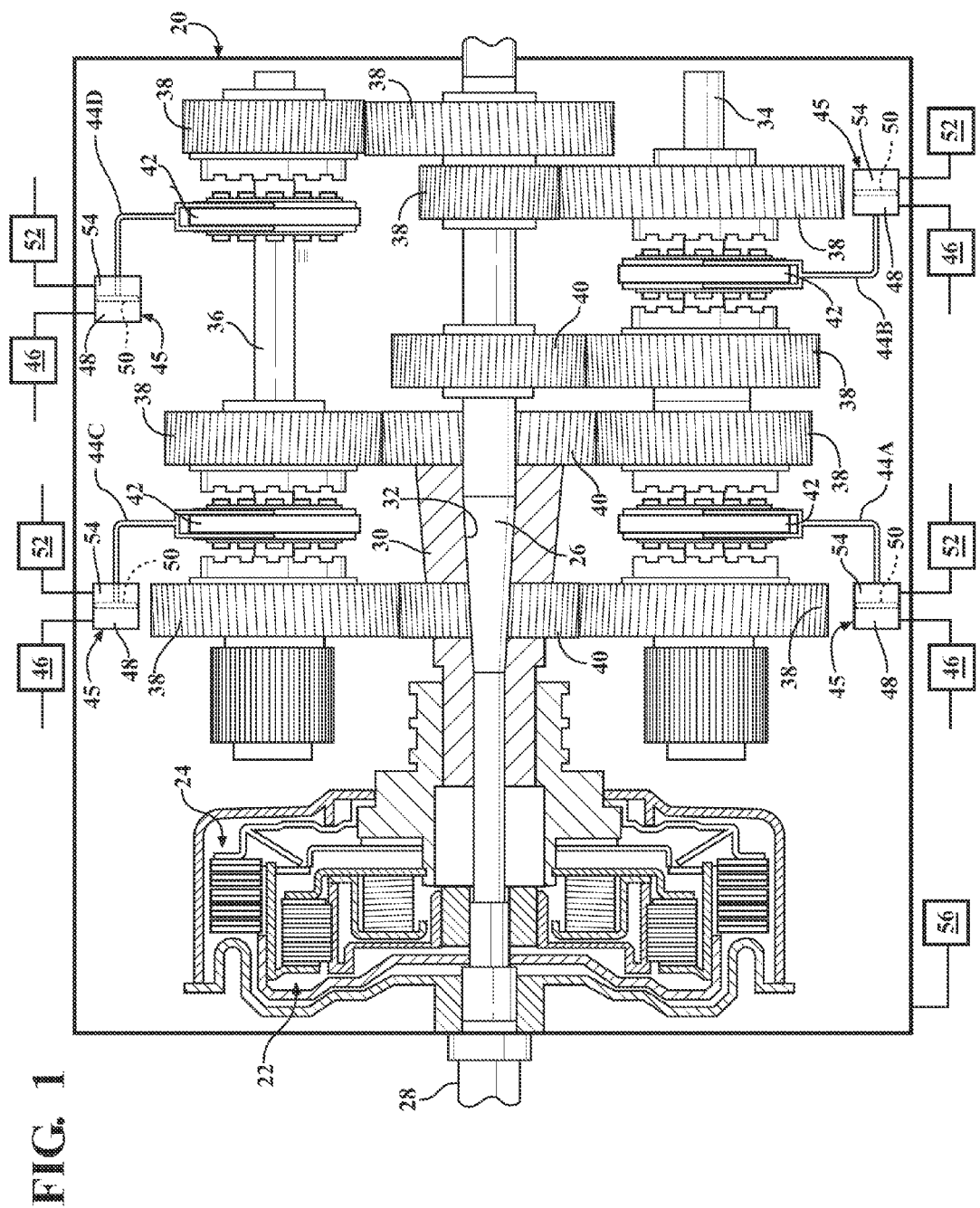
FIG. 1 is a schematic plan view of a dry dual clutch transmission.

Referring to the Figures, wherein like numerals indicate like parts throughout the several views, a transmission, hereinafter referred to as a dual clutch transmission, is generally shown at 20 in FIG. 1. While the invention is described relative to the exemplary dual clutch transmission 20 shown in FIG. 1, it should be appreciated that the invention may be utilized with other styles of transmission, not shown or described herein. The dual clutch transmission 20 includes a first clutch 22 and a second clutch 24. The first clutch 22 is coupled to a first transmission shaft 26, and selectively connects the first transmission shaft 26 to an output 28 of an engine (not shown). e.g., a crankshaft. The second clutch 24 is coupled to a second transmission shaft 30, and selectively connects the second transmission shaft 30 to the output 28 of the engine. The first clutch 22 and the second clutch 24 may include, for example, but are not limited to, a wet clutch or a dry clutch. When engaged, the first clutch 22 interconnects the first transmission shaft 26 with the output 28 of the engine to continuously transmit torque therebetween. When disengaged, the first clutch 22 disconnects the first transmission shaft 26 from the output 28 of the engine to disallow torque transmission 20 therebetween. Similarly, when the second clutch 24 is engaged, the second clutch 24 interconnects the second transmission shaft 30 with the output 28 of the engine to continuously transmit torque therebetween. When disengaged, the second clutch 24 disconnects the first transmission shaft 26 from the output 28 of the engine to disallow torque transmission 20 therebetween.

The first transmission shaft 26 may include either an inner transmission shaft or an outer transmission shaft, and the second transmission shaft 30 includes the other of the inner transmission shaft and the outer transmission shaft. The outer transmission shaft defines a hollow core 32, with the inner transmission shaft disposed therein and concentric with the outer transmission shaft as is known with dual clutch transmissions 20. FIG. 1 shows the first transmission shaft 26 as the inner transmission shaft, and the second transmission shaft 30 as the outer transmission shaft. However, it should be appreciated that the first transmission shaft 26 may alternatively be defined as the outer transmission shaft and the second transmission shaft 30 may be defined as the inner transmission shaft.

The dual clutch transmission 20 includes at least one layshaft. As shown, the dual clutch transmission 20 includes a first layshaft 34 and a second layshaft 36. However, it should be appreciated that the dual clutch transmission 20 need only include one layshaft. Each of the first layshaft 34 and the second layshaft 36 include a plurality of layshaft gears 38 rotatably supported thereon, and in meshing engagement with one of a plurality of transmission shaft gears 40 disposed on one of the first transmission shaft 26 or the second transmission shaft 30.

The dual clutch transmission 20 further includes a plurality of synchronizers 42. Each of the synchronizers 42 rotatably couples at least one of the layshaft gears 38 to one of the first layshaft 34 or the second layshaft 36 for torque transmitting rotation therewith. A synchronizer actuator fork 44 moves each of the synchronizers 42 into engagement with one of the layshaft gears 38. The dual clutch transmission 20 includes multiple synchronizer actuator forks 44 to move the various synchronizers 42 into and out of engagement. The synchronizer actuator forks 44 are referred to collectively by the reference numeral 44, and individually by reference numerals 44A, 44B, 44C, and 44D. The movement of each of the synchronizer actuator forks 44 is controlled by a respective actuator 45. Each actuator 45 includes a pressure solenoid 46, which applies fluid pressure to a first side 48 of an actuator piston 50, and a flow solenoid 52 disposed in series with the pressure solenoid 46, which controls fluid flow from a second side 54 of the actuator piston 50.

The dual clutch transmission 20 may include a control module 56, such as but not limited to a transmission 20 control unit, to control the operation of the dual clutch transmission 20. The control module 56 may include a computer and/or processor, and include all software, hardware, memory, algorithms, connections, sensors, etc., necessary to manage and control the operation of the dual clutch transmission 20. As such, a method of controlling the dual clutch transmission 20, and more specifically a method of learning or identifying a synchronous position of the synchronizer actuator forks 44 may be embodied as a program operable on the control module 56. It should be appreciated that the control module 56 may include any device capable of analyzing data from various sensors, comparing data, making the necessary decisions required to control the operation of the dual clutch transmission 20, and executing the required tasks necessary to control the operation of the dual clutch transmission 20.

In order to get fast responding, smooth operation from the dual clutch transmission 20, the movement of the synchronizers 42 must be consistent and predictable. Accordingly, the method of learning or identifying the synchronous position of the synchronizer actuator forks 44 described below provides the control module 56 with the positional information required to provide consistent and predictable movement of the synchronizers 42 to ensure quick, smooth shifts.

Figure 2:
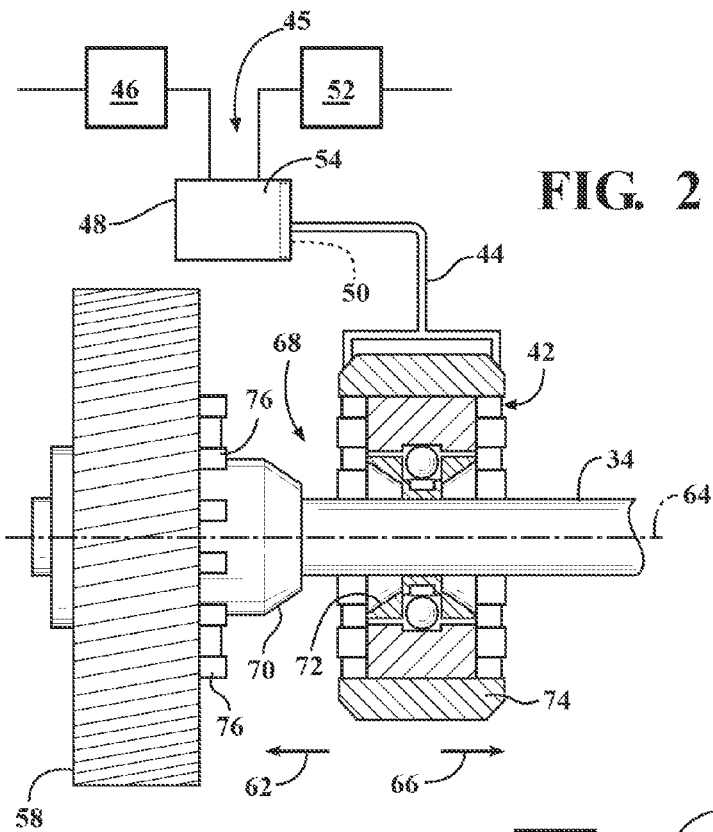
FIG. 2 is an enlarged fragmentary schematic plan view of the dry dual clutch transmission showing a synchronizer and a synchronizer actuator fork in a neutral position.
Figure 3:
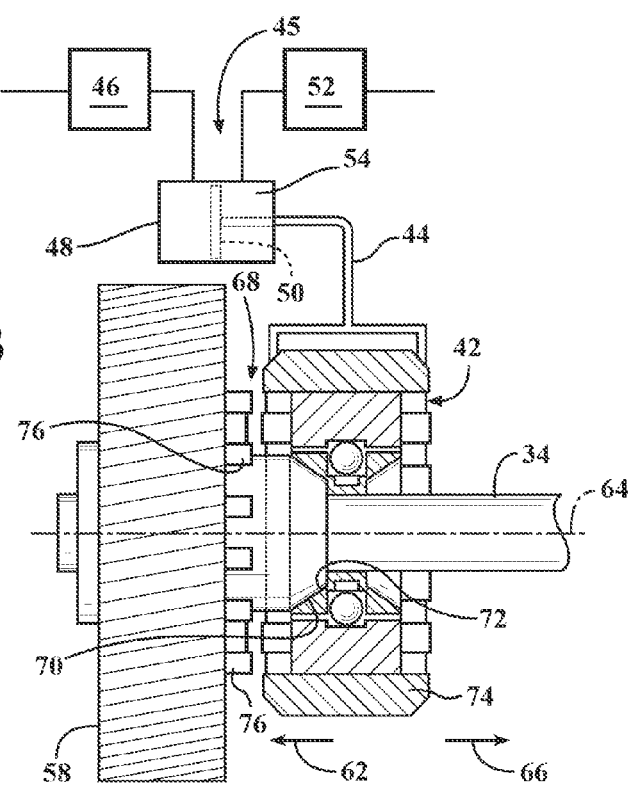
FIG. 3 is an enlarged fragmentary schematic plan view of the dry dual clutch transmission showing the synchronizer and the synchronizer actuator fork in a synchronous position.
Figure 4:
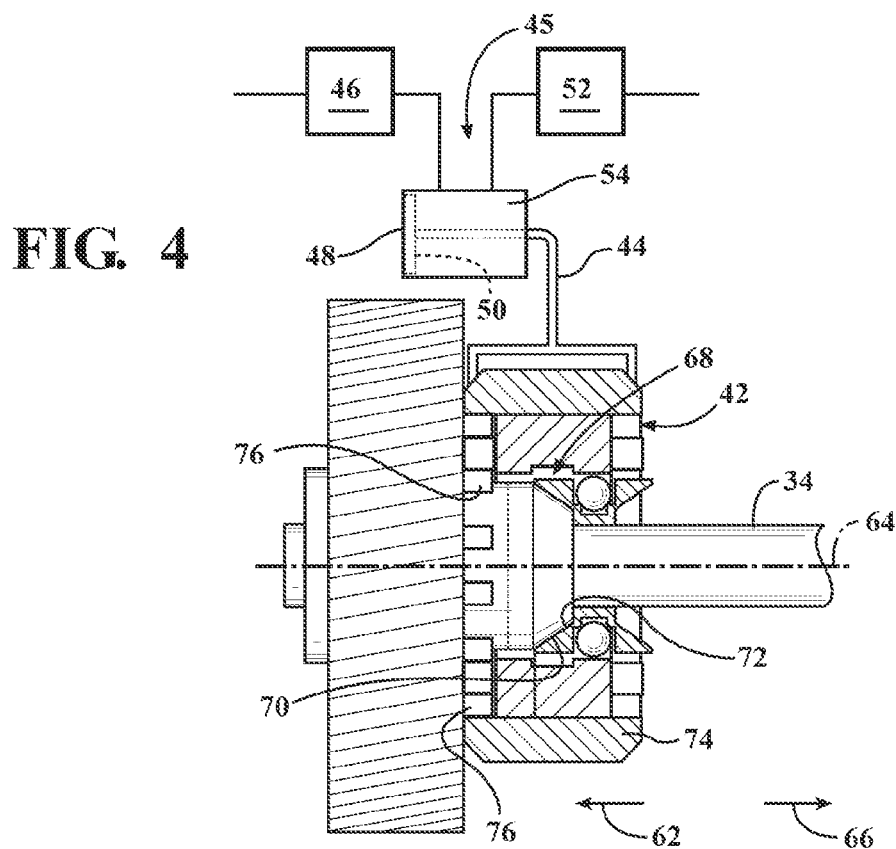
FIG. 4 is an enlarged fragmentary schematic plan view of the dry dual clutch transmission showing the synchronizer and the synchronizer actuator fork in an engaged position.

Referring to FIGS. 2 through 4, a fragmentary portion of the dual clutch transmission 20 shows a first layshaft gear 58 of the dual clutch transmission 20, rotatably supported by the first layshaft 34. A synchronizer 42 is moveable along the first layshaft 34 into interlocking engagement with the first layshaft gear 58. A synchronizer actuator fork 44 is operable to move the synchronizer 42 in a first direction 62 along a longitudinal axis 64 of the first layshaft 34 into interlocking engagement with the first layshaft gear 58 to rotatably couple the first layshaft gear 58 and the first layshaft 34. The synchronizer actuator fork 44 is also operable to move the synchronizer 42 in a second direction 66 along the longitudinal axis 64 of the first layshaft 34, opposite the first direction 62, out of interlocking engagement with the first layshaft gear 58, and potentially into interlocking engagement with another layshaft gear 38 to rotatably couple the other layshaft gear 38 to the first layshaft 34. While the method described below is described in terms of the specific components shown in FIGS. 2 through 4, it should be appreciated that the method is applicable to all of the synchronizer actuator forks 44 of the dual clutch transmission 20.

As shown in FIGS. 2 through 4, the synchronizer 42 includes a respective cone clutch 68 for engaging the first layshaft gear 58. FIGS. 2 through 4 show a simplified exemplary embodiment of the synchronizer 42 including a respective cone clutch 68 for the first layshaft gear 58. When the synchronizer 42 is disposed in a neutral position, which is shown in FIG. 2, the synchronizer 42 is not engaged with the first layshaft gear 58. When the synchronizer 42 is moved toward and into engagement with the first layshaft gear 58, shown in FIG. 3, an external cone 70 on the first layshaft gear 58 contacts an internal cone 72 of the synchronizer 42 in frictional engagement. Because synchronizer 42 is rotatably attached to the first layshaft 34, and the first layshaft gear 58 is rotatable relative to the first layshaft 34 when not engaged with the synchronizer 42, the synchronizer 42 and the first layshaft gear 58 do not generally rotate at the same rotational speed when they initially contact each other. The frictional engagement between the internal cone 72 and the external cone 70 allow the synchronizer 42 and the first layshaft gear 58 to synchronize their rotational speed. As shown in FIG. 4, once the rotational speed of the synchronizer 42 and the first layshaft gear 58 are the same, a collar 74 of the synchronizer 42 slides over and into interlocking engagement with a plurality of drive dogs 76 on the first layshaft gear 58.

The engaged position of the synchronizer 42, which is shown in FIG. 4, is defined as the position of the synchronizer 42 when the collar 74 of the synchronizer 42 is engaged with the drive dogs 76 of the first layshaft gear 58 and the synchronizer 42 and the first layshaft gear 58 are rotatably locked together. The engaged position of the synchronizer actuator fork 44 is the position of the synchronizer actuator fork 44 relative to the first layshaft 34 when the synchronizer 42 is disposed in the engaged position. The synchronous position of the synchronizer 42, which is shown in FIG. 3, is defined as the position of the synchronizer 42 when the synchronizer 42 makes initial frictional contact with the first layshaft gear 58, but the collar 74 of the synchronizer 42 is not yet engaged with the drive dogs 76 of the first layshaft gear 58. Accordingly, the synchronous position is when the synchronizer 42 and the first layshaft gear 58 are synchronizing their respective rotational speeds. The synchronous position of the synchronizer actuator fork 44 is the position of the synchronizer actuator fork 44 relative to the first layshaft 34 when the synchronizer 42 is disposed in the synchronous position. It should be appreciated that while the neutral position, the synchronous position and the engaged position have been defined with reference to the first layshaft gear 58 shown in FIGS. 2 through 4, the above described positions are applicable to all of the layshaft gears 38 of the dual clutch transmission 20 and their respective synchronizers 42.

The method includes providing the control module 56 operable to control the dual clutch transmission 20. As noted above, the control module 56 includes all software, hardware, memory, algorithms, connections, sensors, etc. necessary to manage and control the operation of the dual clutch transmission 20. The control module 56 is operable to perform the various tasks of the method described below.

Prior to initiating the test procedure described below, the dual clutch transmission 20 must be disengaged from the engine, and all synchronizers 42 of the dual clutch transmission 20 must be in their respective neutral position. Accordingly, the method includes sensing a position of the synchronizers 42 to determine if the synchronizers 42 are disposed in their respective neutral positions, and sensing a status of the first clutch 22 and the second clutch 24 to determine if the first clutch 22 and the second clutch 24 are disposed in their respective engaged state or in their respective disengaged state. If the synchronizers 42 are disposed in their respective neutral position, and both of the first clutch 22 and the second clutch 24 are disposed in their respective disengaged states, then the test procedure may continue. If, however, one of the synchronizers 42 is not disposed in its respective neutral position, or one of the first clutch 22 or the second clutch 24 is disposed in its respective engaged position, then the test procedure is aborted until such time as these requisite conditions are satisfied.

If the synchronizers 42 are disposed in their respective neutral positions, and both of the first clutch 22 and the second clutch 24 are disposed in their respective disengaged states, then the method includes sensing the rotational speed of the first layshaft 34 and the second layshaft 36, while the synchronizer 42 is disposed in the neutral position, and prior to moving the synchronizer 42 out of its neutral position. Preferably, the test procedure may only begin when the rotational speed of the first layshaft 34 is greater than a minimum test speed and less than a maximum test speed, and when the sensed rotational speed of the second layshaft 36 is equal to or less than a pre-defined near zero speed. The minimum test speed of the first layshaft 34 is preferably between the range of 200 rpm's and 2,000 rpm's. However, it should be appreciated that the minimum test speed may vary from the exemplary range described above. The maximum test speed of the first layshaft 34 is preferably between the range of 1,000 rpm's and 3,000 rpm's. However, it should be appreciated that the maximum test speed may vary from the exemplary range described above. The pre-defined near zero speed of the second layshaft 36 is preferably between the range of one rpm and 1,000 rpm's. However, it should be appreciated that the pre-defined near zero speed may vary from the exemplary range described above.

If the rotational speed of the first layshaft 34 is continuously sensed over time, then the sensed rotational speed of the first layshaft 34 over time may be used to calculate the rate of acceleration of the first layshaft 34. If the rate of acceleration is negative, i.e., the first layshaft 34 is decelerating, then this rate of acceleration is defined as a first rate 84 (shown in FIG. 5) of deceleration of the first layshaft 34. The acceleration of the first layshaft 34 may be sensed in some other manner to define the first rate 84 of deceleration. It should be appreciated that the first rate 84 of deceleration is sensed while the synchronizer 42 is disposed in the neutral position, prior to moving the synchronizer 42 out of the neutral position.

If the above noted conditions are satisfied in order to proceed with the test procedure, and the first rate 84 of deceleration has been sensed, then the synchronizer 42 is moved along the first shaft, from the neutral position toward the first layshaft gear 58, with the synchronizer actuator fork 44. In order to move the synchronizer 42 toward the first layshaft gear 58, a pressure force is applied to the actuator 45 of the synchronizer actuator fork 44. As noted above, the actuator 45 includes the actuator piston 50, which is controlled by the pressure solenoid 46 and the flow solenoid 52. By applying the fluid pressure force to the appropriate side of the actuator piston 50, the pressure force moves the synchronizer actuator fork 44 in the first direction 62 along the longitudinal axis 64 of the first layshaft 34, toward the first layshaft gear 58.

Figure 5:
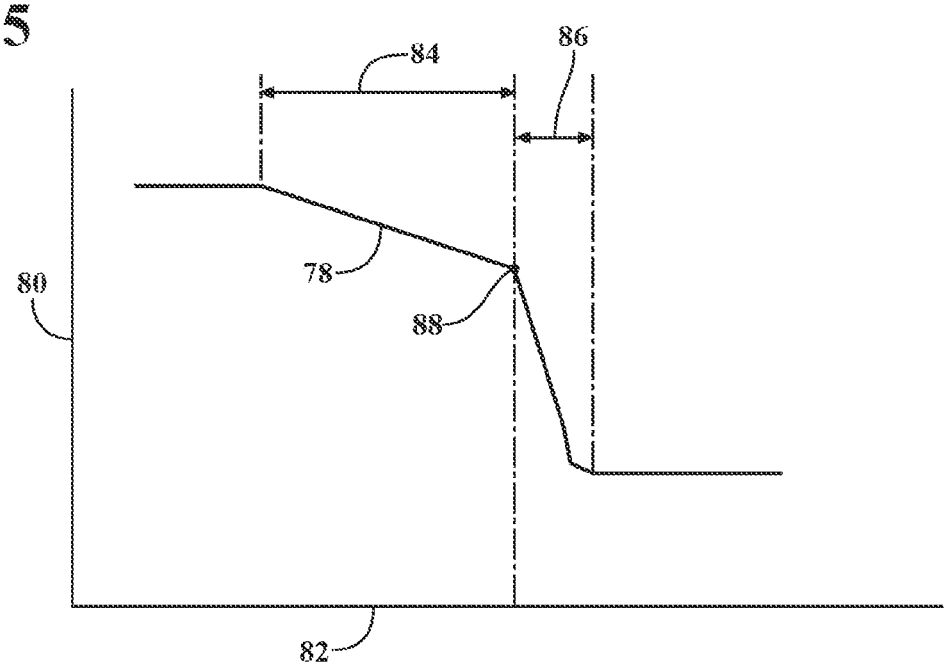
FIG. 5 is a graph showing the acceleration of a first layshaft of the dry dual clutch transmission relative to position of the synchronizer along the first layshaft when moving between the neutral position and the engaged position.

While the synchronizer actuator fork 44 moves the synchronizer 42 along the first shaft, from the neutral position toward the first layshaft gear 58, the acceleration rate of the first layshaft 34 is continuously sensed to identify a change in the acceleration rate of the first layshaft 34 from the first rate 84 of deceleration to a second rate 86 (shown in FIG. 5) of deceleration. The second rate 86 of deceleration is greater than the first rate 84 of deceleration. Accordingly, the second rate 86 of deceleration causes the first layshaft 34 to slow down faster than the first rate 84 of deceleration. Referring to FIG. 5, the acceleration of the first layshaft 34 is shown by reference line 78. The rate of acceleration is shown along a vertical axis 80, and the position of the synchronizer 42 along the first layshaft 34 is represented by a horizontal axis 82. Within FIG. 5, the rate of acceleration is shown decreasing with movement from left to right on the page of FIG. 5. This decreasing acceleration is a negative acceleration, or a deceleration rate. The first rate 84 of deceleration is generally represented by line segment 84. The second rate 86 of deceleration is generally represented by line segment 86. The point at which the acceleration rate changes from the first rate 84 of acceleration to the second rate 86 of acceleration, is generally indicated by marker 88, and represents the synchronous position of the synchronizer 42, and the synchronous position of the synchronizer actuator fork 44 relative to the first layshaft 34.

The location of the synchronizer actuator fork 44 relative to the first shaft, at which the rate of acceleration of the first shaft changes from the first rate 84 of deceleration to the second rate 86 of deceleration, is identified as the synchronous position of the synchronizer actuator fork 44. As noted above, the location at which the rate of acceleration of the first shaft changes from the first rate 84 of deceleration to the second rate 86 of deceleration is indicated by marker 88, shown in FIG. 5, and is the synchronous position of the synchronizer actuator fork 44.

The identified synchronous position of the synchronizer actuator fork 44 is compared with a previously known neutral position of the synchronizer actuator fork 44, and a previously known engaged position of the synchronizer actuator fork 44, to determine if the identified synchronous position of the synchronizer actuator fork 44 is between the previously known neutral position and the previously known engaged position of the synchronizer actuator fork 44. Because the synchronous position of the synchronizer actuator fork 44 must be disposed between the neutral position and the engaged position, if the identified synchronous position is not disposed between the known neutral position and the known engaged positions, then the identified synchronous position is inaccurate, and should not be used to control the dual clutch transmission 20.

Once the synchronous position of the synchronizer actuator fork 44 is identified, then the control module 56 may move the synchronizer 42 and the synchronizer actuator fork 44 back into their respective neutral positions. The control module 56 may then perform the above described test procedure for each synchronizer/layshaft gear combination of the dual clutch transmission 20, thereby learning and/or identifying the synchronous position for each synchronizer/layshaft gear combination of the dual clutch transmission 20. The identified synchronous positions for reach of the synchronizer actuator forks 44 may be saved in the memory of the control module 56, and used by the control module 56 to accurately and precisely control the operation of the dual clutch transmission 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of operating a dual clutch transmission, the method comprising:

sensing a deceleration rate of a first shaft, with a transmission control module, when a synchronizer is positioned in a neutral position to define a first rate of deceleration;
moving the synchronizer along the first shaft from the neutral position toward a gear with a synchronizer actuator fork;
sensing a deceleration rate of the first shaft, with the transmission control module, while the synchronizer actuator fork moves the synchronizer along the first shaft to identify a change from the first rate of deceleration to a second rate of deceleration; and
identifying a location, with the transmission control module, of the synchronizer actuator fork relative to the first shaft at which the rate of deceleration of the first shaft changes from the first rate of deceleration to the second rate of deceleration as a synchronous position of the synchronizer actuator fork.

2. method as set forth in claim 1 further comprising sensing a rotational speed of a second shaft, with the transmission control module, when the synchronizer is positioned in the neutral position.

3. A method as set forth in claim 2 wherein moving the synchronizer along the first shaft is further defined as moving the synchronizer along the first shaft when the sensed rotational speed of the second shaft is equal to or less than a pre-defined near zero speed.

4. A method as set forth in claim 1 further comprising sensing a status of a first clutch and a second clutch, with the transmission control module, to determine if the first clutch and the second clutch are disposed in an engaged state or a disengaged state.

5. A method as set forth in claim 4 wherein moving the synchronizer along the first shaft is further defined as moving the synchronizer along the first shaft when both the first clutch and the second clutch are disposed in their respective disengaged states.

6. A method as set forth in claim 1 wherein moving the synchronizer along the first shaft is further defined as moving the synchronizer along the first shaft when a rotational speed of the first shaft is greater than a minimum test speed and less than a maximum test speed.

7. A method as set forth in claim 6 further comprising sensing the rotational speed of the first shaft prior to moving the synchronizer along the first shaft.

8. A method as set forth in claim 1 wherein the second rate of deceleration is greater than the first rate of deceleration.

9. method as set forth in claim 1 further comprising comparing the identified synchronous position of the synchronizer actuator fork with a previously known neutral position of the synchronizer actuator fork and a previously known engaged position of the synchronizer actuator fork, with the transmission control module, to determine if the identified synchronous position of the synchronizer actuator fork is between the previously known neutral position and the previously known engaged position of the synchronizer actuator fork.

10. A method as set forth in claim 1 further comprising sensing a position of the synchronizer, with the transmission control module, to determine if the synchronizer is in the neutral position.

11. A method as set forth in claim 1 further comprising moving the synchronizer back into the neutral position, with the synchronizer actuator fork, after identifying the synchronous position of the synchronizer actuator fork.

12. A method of identifying a synchronous position of a synchronizer actuator fork of a dual clutch transmission, the method comprising:

sensing a status of a first clutch and a second clutch, with a transmission control module, to determine if the first clutch and the second clutch are disposed in an engaged state or a disengaged state;

sensing a rotational speed of a second shaft, with the transmission control module;

sensing a deceleration rate of a first shaft, with the transmission control module, when a synchronizer is positioned in a neutral position to define a first rate of deceleration;

moving the synchronizer along the first shaft from the neutral position toward a gear with a synchronizer actuator fork when the sensed rotational speed of the second shaft is equal to or less than a pre-determined near zero speed, and when the first clutch and the second clutch are each disposed in their respective disengaged states;

sensing a deceleration rate of the first shaft, with the transmission control module, while the synchronizer actuator fork moves the synchronizer along the first shaft;

identifying a change in the deceleration rate, with the transmission control module, while the synchronizer actuator fork moves the synchronizer along the first shaft, from the first rate of deceleration to a second rate of deceleration; and identifying a location, with the transmission control module, of the synchronizer actuator fork relative to the first shaft at which the rate of deceleration of the first shaft changes from the first rate of deceleration to the second rate of deceleration as the synchronous position of the synchronizer actuator fork.

13. A method as set forth in claim 12 further comprising sensing the rotational speed of the first shaft, with the transmission control module, prior to moving the synchronizer along the first shaft.

14. A method as set forth in claim 13 wherein moving the synchronizer along the first shaft is further defined as moving the synchronizer along the first shaft when the rotational speed of the first shaft is greater than a minimum test speed and less than a maximum test speed.

15. A method as set forth in claim 12 wherein the second rate of deceleration is greater than the first rate of deceleration.

16. A method as set forth in claim 12 further comprising comparing the identified synchronous position of the synchronizer actuator fork with a previously known neutral position of the synchronizer actuator fork and a previously known engaged position of the synchronizer actuator fork, with the transmission control module, to determine if the identified synchronous position of the synchronizer actuator fork is between the previously known neutral position and the previously known engaged position of the synchronizer actuator fork.

17. A method as set forth in claim 12 further comprising moving the synchronizer back into the neutral position, with the synchronizer actuator fork, after identifying the synchronous position of the synchronizer actuator fork.

18. A method as set forth in claim 12 further comprising sensing a position of the synchronizer, with the transmission control module, prior to moving the synchronizer to determine if the synchronizer is in the neutral position.

19. A dual clutch transmission for a vehicle, the dual clutch transmission comprising:

a first shaft supporting at least one synchronizer and at least one gear thereon;

a synchronizer actuator fork coupled to the synchronizer and operable to move the synchronizer along the first shaft between a neutral position and an engaged position; and a transmission control module having a processor, a memory storing at least one algorithm thereon for controlling operation of the dual clutch transmission, and at least one sensor for sensing information related to control of the dual clutch transmission, wherein the transmission control module is operable to:

sense a deceleration rate of the first shaft when the synchronizer is positioned in the neutral position to define a first rate of deceleration;

move the synchronizer along the first shaft from the neutral position toward the gear and into the engaged position with the synchronizer actuator fork;

sense a deceleration rate of the first shaft while the synchronizer actuator fork moves the synchronizer along the first shaft toward the gear to identify a change in the acceleration rate of the first shaft from the first rate of deceleration to a second rate of deceleration; and identify a location of the synchronizer actuator fork relative to the first shaft at which the rate of deceleration of the first shaft changes from the first rate of deceleration to the second rate of deceleration as a synchronous position of the synchronizer actuator fork.

* * * * *